US010445724B2

(12) United States Patent
Jung et al.

(10) Patent No.: US 10,445,724 B2
(45) Date of Patent: Oct. 15, 2019

(54) SYSTEM FOR PERFORMING PAYMENT IN MOBILE TERMINAL

(71) Applicant: Samsung Electronics Co., Ltd., Gyeonggi-do (KR)

(72) Inventors: Eui-Chang Jung, Seoul (KR); Bo-Kun Choi, Seoul (KR); Min-Kyung Hwang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/059,816

(22) Filed: Oct. 22, 2013

(65) Prior Publication Data

US 2014/0114856 A1 Apr. 24, 2014

(30) Foreign Application Priority Data

Oct. 23, 2012 (KR) ........................ 10-2012-0117918

(51) Int. Cl.
*G06Q 20/32* (2012.01)
*G06Q 20/34* (2012.01)

(52) U.S. Cl.
CPC ..... *G06Q 20/3278* (2013.01); *G06Q 20/3223* (2013.01); *G06Q 20/3578* (2013.01)

(58) Field of Classification Search
CPC ........ G06Q 20/40; G06Q 40/02; G06Q 20/04; G06Q 20/105; G06Q 20/18; G06Q 20/3278
See application file for complete search history.

(56) References Cited

U.S. PATENT DOCUMENTS 4,321,672 A * 3/1982 Braun .................... G06Q 20/04 235/379
5,220,501 A * 6/1993 Lawlor .................. G06Q 20/04 379/93.18

(Continued)

FOREIGN PATENT DOCUMENTS

CN 101657833 A 2/2010
CN 101901436 A 12/2010

(Continued)

OTHER PUBLICATIONS

European Search Report dated Feb. 1, 2017.

(Continued)

*Primary Examiner* — Jessica Lemieux
(74) *Attorney, Agent, or Firm* — Cha & Reiter, LLC.

(57) ABSTRACT

Disclosed are a system for performing payment, and a recording medium storing a program source for the method. The method employed by a first terminal enables a second terminal to perform payment for a product purchase using one or more pieces of financial account information accessible by the first terminal by: transmitting the one or more pieces of financial account information to the second terminal using an NFC connection; generating a registration request message comprising a request for registration of the second terminal associated with the transmitted financial account information enabling the second terminal to perform the payment by using the transmitted financial account information; and transmitting the registration request message to a financial organization server, the financial organization server being associated with the transmitted financial account information.

10 Claims, 13 Drawing Sheets

110 Payor
120 Payee
130 NFC Tag
140 NFC Transaction Terminal
160 Financial server
PRODUCT INFORMATION 701
PURCHASE APPROVAL REQUEST MESSAGE 703
PURCHASE APPROVAL MESSAGE 705
709 PAYMENT REQUEST MESSAGE
PAYMENT APPROVAL REQUEST MESSAGE 711
PAYMENT APPROVAL MESSAGE 713
PAYMENT NOTIFICATION MESSAGE 715
PAYMENT NOTIFICATION MESSAGE 719

(56) References Cited

U.S. PATENT DOCUMENTS 6,098,053 A * 8/2000 Slater .................... G06Q 20/02 705/35
8,127,982 B1 * 3/2012 Casey .................... G06Q 40/02 235/379
8,793,192 B2 * 7/2014 Hammad ............... G06Q 20/12 705/44
2010/0043061 A1 * 2/2010 Martin ............... G06Q 30/0603 726/4
2010/0082481 A1 * 4/2010 Lin ...................... G06Q 20/042 705/41
2010/0145850 A1 * 6/2010 Nagai .................. G06Q 20/105 705/41
2010/0153272 A1 * 6/2010 Wentker .................. G06F 21/33 705/44
2011/0238569 A1 9/2011 Kim et al.
2012/0136732 A1 * 5/2012 McMillen ............ G06Q 20/105 705/16
2012/0136786 A1 * 5/2012 Romagnoli ............ G06Q 20/10 705/44
2013/0046690 A1 * 2/2013 Calman .................. G06Q 40/02 705/44
2013/0060708 A1 * 3/2013 Oskolkov .............. G06Q 20/10 705/75
2013/0110603 A1 * 5/2013 Chi .................... G06Q 20/3274 705/14.23

FOREIGN PATENT DOCUMENTS

CN 102204111 A 9/2011
EP 2 157 540 A1 2/2010
EP 2157540 A1 * 2/2010 ........... G06Q 20/105
EP 2 372 628 A2 10/2011
WO 2010/019668 A2 2/2010
WO WO 2010019668 A2 * 2/2010 ......... G06Q 30/0603
WO 2011/119407 A1 9/2011

OTHER PUBLICATIONS

Chinese Search Report dated Mar. 2, 2018.
Korea Search Report dated Jan. 3, 2019.
Chinese Search Report dated Aug. 5, 2019.

* cited by examiner

SYSTEM FOR PERFORMING PAYMENT IN MOBILE TERMINAL

CLAIM OF PRIORITY

This application claims the priority under 35 U.S.C. § 119(a) to Korean Application Serial No. 10-2012-0117918, which was filed in the Korean Intellectual Property Office on Oct. 23, 2012, the entire content of which is hereby incorporated by reference.

FIELD OF THE INVENTION

The present invention relates to a system for performing payment in a mobile terminal.

BACKGROUND

As an electronic payment infrastructure is expanded, a financial payment service based on payment with a card, such as a credit card and a check card becomes more prevalent. In a known financial payment service a user purchases a product by using a credit card and the like in an affiliated store, comprising payment for a product to a financial organization, such as a card company, on a settlement day, and the affiliated store receives the payment for the product from the financial organization. In such known systems, a Value Added Network (VAN) company provides an agent service related to a card payment between an affiliated store and a financial organization.

Wireless communication technologies and communication modules for supporting various communication schemes are embedded in various terminals, such as a smart phone. The communication technologies include a Near Field Communication (NFC) technology using a magnetic field induction scheme offering relatively high security, a short connection setting time, and low-power driving.

A known system attempts to combine use of the NFC technology with a financial payment service. For example, a user possessing a terminal in which an NFC financial chip including credit card information is embedded may perform a payment request by putting his/her terminal close to a payment terminal in which an NFC module is embedded when the user purchases a product in a credit card affiliated store.

There are occasions when a user desires to make payment for a product using credit card information of another person. For example, a child may desire to purchase a product using credit card information of his/her parents, or an individual makes a request for payment for a product using credit card information of a corporation. This is not a problem where a user borrows and uses a conventional credit card having a physical shape. However, where credit card information is converted into an electronic form and is stored in a terminal, such as a smart phone, this without a comprehensive method of rental of a terminal for example, causes a problem because of inconsistency in smart phone data and purchaser use. A system according to invention principles addresses this deficiency and associated problems.

SUMMARY

Accordingly, an aspect of the present invention is to provide a method of enabling a plurality of users to perform a financial payment by using one piece of financial account information.

Other objects of the present invention will be recognized through the embodiments below.

In accordance with an aspect of the present invention, a method of enabling a first terminal to permit a second terminal to perform payment by using one or more pieces of financial account information accessible by the first terminal. The method includes: transmitting the one or more pieces of financial account information accessible by the first terminal to the second terminal by using a Near Field Communication (NFC) connection; generating a registration request message comprising a request for registration of the second terminal associated with the transmitted financial account information enabling the second terminal to perform the payment by using the transmitted financial account information; and transmitting the registration request message to a financial organization server, the financial organization server being associated with the transmitted financial account information.

In accordance with another aspect of the present invention, a method of performing, by a first terminal make a payment by using one or more pieces of financial account information accessible by a second terminal. The first terminal receives, from the second terminal, one or more pieces of financial account information accessible by the second terminal by using an NFC connection; and receives a response message notifying that the first terminal is registered in correspondence with the received financial account information enabling payment using the received financial account information from a financial organization server associated with the received financial account information.

In accordance with another aspect of the present invention, an apparatus for enabling a first terminal permits a second terminal to perform payment using: a communication unit including a Near Field Communication (NFC) communication module and a wireless communication module; a secure storage unit which stores one or more pieces of financial account information; a touch screen which displays a guide image a touch screen which displays a guide image enabling receiving a selection of user entered financial account information to be transmitted to the second terminal; and a controller configure for, transmitting one or more pieces of financial account information selected by the user to the second terminal through the NFC communication module, generating a registration request message comprising a request for registration of the second terminal associated with the transmitted financial account information enabling the second terminal to initiate payment by using the transmitted financial account information, and transmitting the generated registration request message to a financial organization server, the financial organization server being associated with the transmitted financial account information through the wireless communication module.

In accordance with another aspect of the present invention, an apparatus for performing, by a first terminal, includes: a communication unit including a Near Field Communication (NFC) communication module and a wireless communication module; a controller configured to receive, from the second terminal, one or more pieces of financial account information accessible by the second terminal through the NFC module, and to receive a response message notifying that the first terminal is registered in association with the received financial account information enabling payment using the received financial account information from a financial organization server, the financial organization server being associated with the received financial account information through the wireless communication module.

In accordance with another aspect of the present invention, a processor readable recording medium stores a program. The program upon execution: transmits one or more pieces of financial account information accessible by a first terminal to a second terminal by using an NFC connection; generates a registration request message comprising a request for registration of the second terminal associated with the transmitted financial account information enabling the second terminal to perform the payment by using the transmitted financial account information; and transmits the registration request message to a financial organization server, the financial organization server being associated with the transmitted financial account information.

In a further feature, a processor readable recording medium stores a program. The program upon execution: receives, from a second terminal, one or more pieces of financial account information accessible by the second terminal by using an NFC connection; and receives a response message notifying that the first terminal is registered in correspondence with the received financial account information enabling payment using the received financial account information from a financial organization server, the financial organization server being associated with the received financial account information.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

In the following description of the exemplary embodiment, a detailed description of known configurations or functions incorporated herein will be omitted when it is determined that the detailed description may make the subject matter of the present disclosure unclear.

As described above, in a recent aspect in which credit card information is stored in a terminal in an electronic form to perform a financial payment, a method of enabling a plurality of users to perform a financial payment by using one piece of credit card information is in an inadequate state.

Accordingly, the present invention provides a method of enabling a plurality of users to perform a financial payment by using the same financial account information (including credit card information and bank account information). Further, the present invention provides a method capable of effectively controlling a financial payment of another person using financial account information of a user.

Hereinafter, the embodiments of the present invention will be described with reference to the accompanying drawings.

Figure 1:
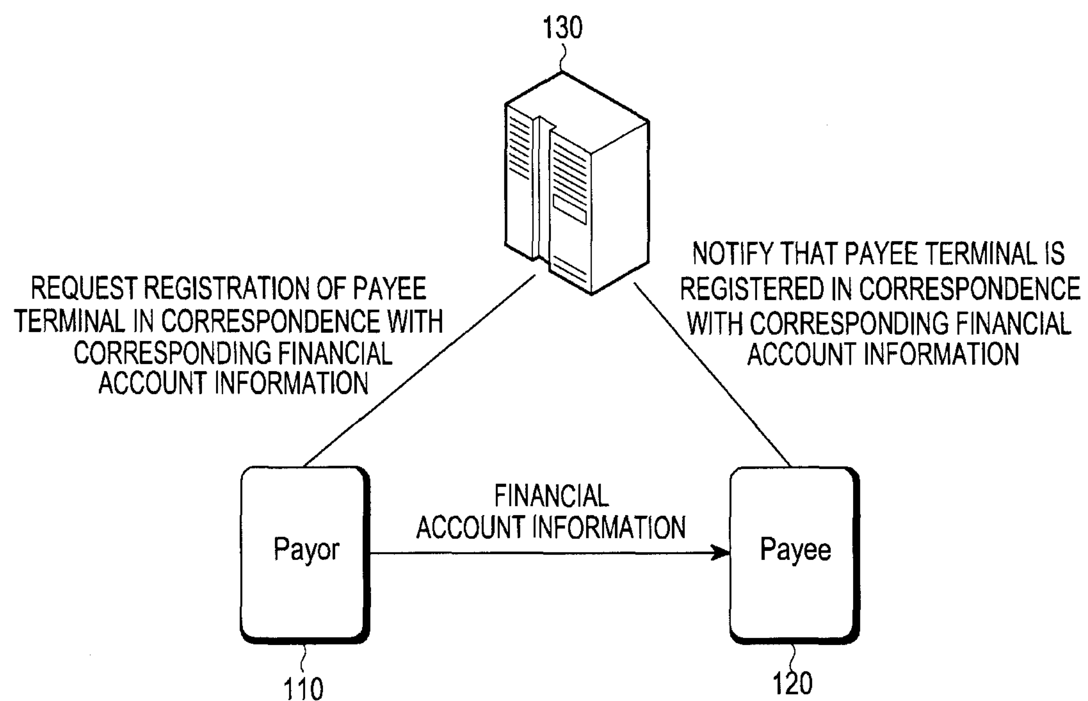
FIG. 1 shows a payment system according to the embodiments of the present invention.

FIG. 1 shows a payment system including a terminal 110 (hereinafter, referred to as a "payor terminal") of a user (hereinafter, referred to as a "payor"). The payor desires to allow another person to perform a financial payment by using financial account information under a name of the payor using a terminal 120 (hereinafter, referred to as a "payee terminal") of another person (hereinafter, referred to as a "payee"). An NFC connection is established between the payor terminal 110 and the payee terminal 120. In an embodiment the payor terminal 110 and the payee terminal 120 are embedded with an NFC module. The payor terminal 110 transmits one or more pieces of financial account information to terminal 120 through the NFC connection. The one or more pieces of financial account information are selected by the payor from one or more pieces of financial account information stored by the payor himself/herself. Payor terminal 110 executes a finance application when the NFC connection is established, and displays a guide image for transmitting the financial account information, thereby enabling the payor to select the financial account information to be transmitted.

In response to completion of the transmission of the financial account information, the payor terminal 110 generates a registration request message comprising a request for registration of the payee terminal 120 in association with the corresponding financial account information so that the payee terminal 120 may perform the financial payment by using the transmitted financial account information. The payor terminal 110 transmits the generated registration request message to a financial organization server 130, for example, a server of a credit card issuing company, corresponding to the corresponding financial account information.

The financial organization server 130 registers the payee terminal 120 in association with the corresponding financial account information according to the request of the payor terminal 110, and generates a message notifying of a successful registration of the payee terminal 120 and transmits the generated message to the payee terminal 120. The registration of the payee terminal 120 in association with the corresponding financial account information comprises mapping a unique identification number of the payee terminal 120 to a corresponding credit card number or mapping a unique identification number of the payee terminal 120 to a corresponding bank account, for example. Financial organization server 130 transmits a message notifying of the registration event to the payor terminal 110. The payee terminal 120 performs a financial payment by using the financial account information received from the payor terminal 110.

The system advantageously enables a financial payment by using the financial account information of the payor by the payee without additionally opening a financial account. The system employs a process of transmitting financial account information stored in the payor terminal to the payee terminal and registering the payee terminal in a corresponding financial organization server, and a process of performing payment by using the received financial account information by the payee terminal.

Figure 2:
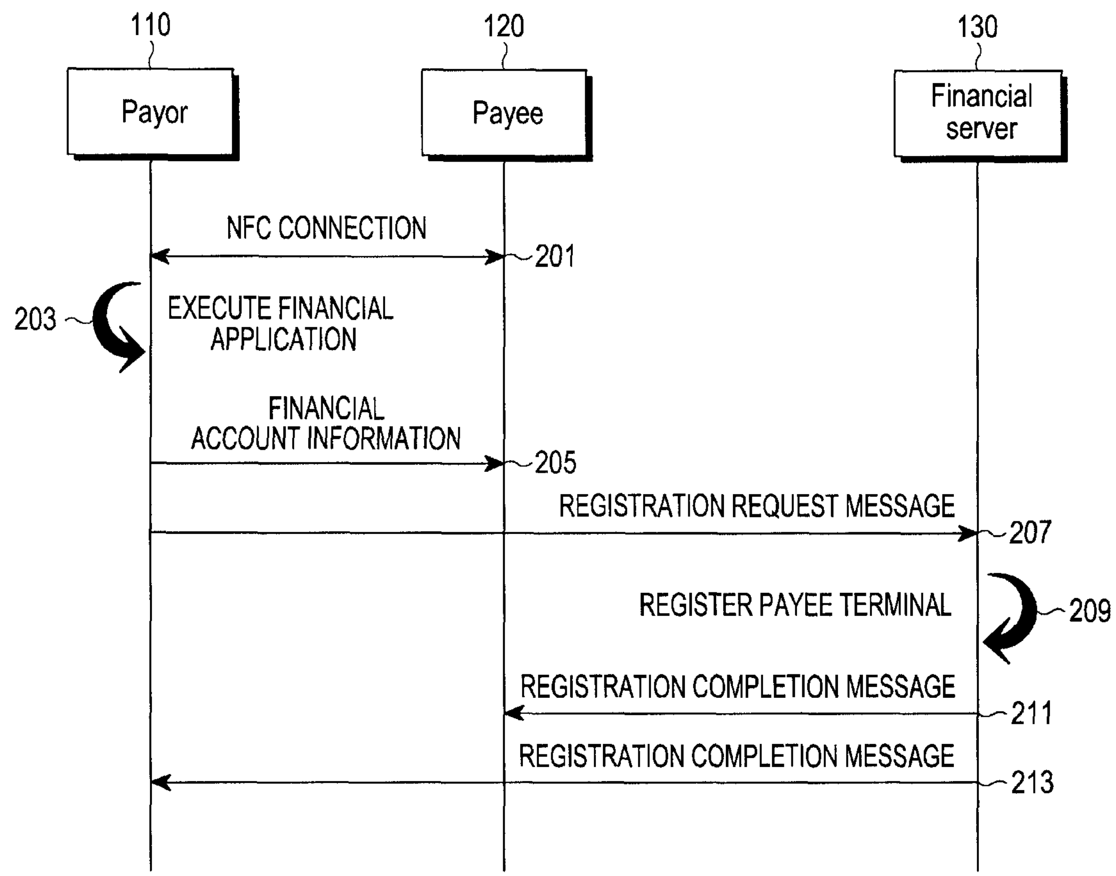
FIG. 2 shows operations of a process for transmitting financial account information stored in a payor terminal to a payee terminal, and registering the payee terminal to a server of a corresponding financial organization according to an embodiment of the present invention.

FIG. 2 shows operations of a process for transmitting financial account information stored in a payor terminal to a payee terminal, and registering the payee terminal to a server of a corresponding financial organization. In step 201, the payor terminal 110 initiates communication with the payee terminal 120 to establish the NFC connection. The NFC connection is established in a Peer to Peer (P2P) mode of the available the NFC communication modes, for example. In response to the NFC connection being established, the payor terminal 110 obtains a unique identification number of the payee terminal 120. The unique identification number may be, for example, an Electronic Serial Number (ESN) of the payee terminal 120, a Mobile Identification Number (MIN), or a personal identification number.

Figure 3A:
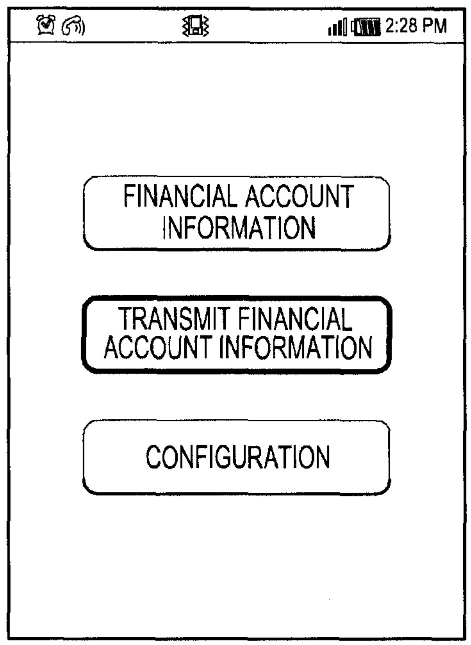
FIGS. 3A and 3B shows image menus used in a process of transmitting financial account information according to an embodiment of the present invention.
Figure 3B:
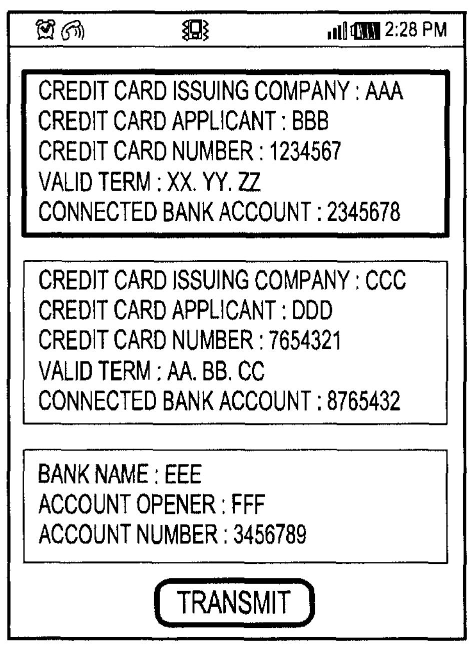

In step 203, the payor terminal 110 guides the payor to transmit financial account information to the payee terminal 120 by executing a financial application. For example, as illustrated in FIG. 3A, the payor terminal 110 executes and displays menu option of the financial application in response to the financial application being initiated automatically or by the user in response to the NFC connection being established. In response to the user selecting a menu item for transmitting the financial account information, the payor terminal 110 displays the stored financial account information as illustrated in FIG. 3B.

In step 205, the payor terminal 110 transmits one or more pieces of financial account information selected by the user to the payee terminal 120. The financial account information comprises data including, credit card information identifying at least one of a credit card issuing company, a credit card applicant, a credit card number, a valid term, a password, a connected bank account, or bank account information identifying at least one of an account opening bank, a bank account applicant, a bank account number, and a password.

In step 207, the payor terminal 110 generates a registration request message comprising a request for registration of the payee terminal 120 in association with the corresponding financial account information so that the payee terminal 120 may perform the financial payment by using the transmitted financial account information. The payor terminal 110 transmits the generated registration request message to the financial organization server 130 corresponding to the corresponding financial account information. The registration request message includes at least one element of the information associated with the corresponding financial account including, a unique identification number of the payor terminal 110, and a unique identification number of the payee terminal 120. In response to two or more pieces of financial account information corresponding to different financial organizations being transmitted, the registration request message is transmitted to the respective financial organization servers.

Figure 4A:
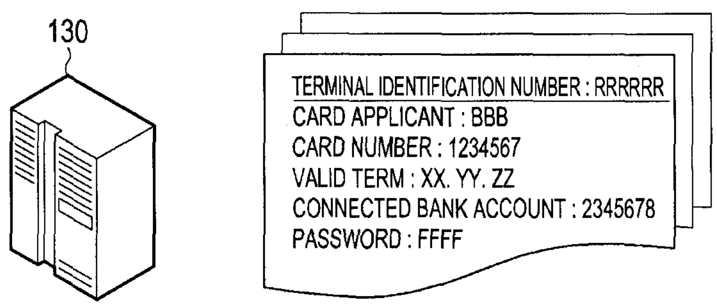
FIGS. 4A and 4B illustrates registering a payee terminal in correspondence with the financial account information according to an embodiment of the present invention.

The financial organization server 130 stores the financial account information on the user of the payor terminal 110. The financial organization server 130 may be a server of the credit card issuing company or a server of the account opening bank. An example of the credit card information stored in the server of the credit card issuing company is illustrated in FIG. 4A. The credit card information stored in the server of the credit card issuing company includes data identifying at least one of, a credit card applicant, a credit card number, a valid term, a connected bank account, a password, and a unique identification number of the terminal. The financial organization server 130 performs user authentication based on the financial account information, the password, and the identification number of the terminal received from an NFC payment terminal (or received from a VAN server). In response to the payor purchasing a product and when the user is authenticated, the payment request is approved.

In step 209, when the registration request message comprising the request for the registration of the payee terminal 120 in association with the corresponding financial account information, is received from the payor terminal 110, the financial organization server 130 analyzes the received registration request message, and registers the payee terminal 120 in association with the corresponding financial account information.

Figure 4B:
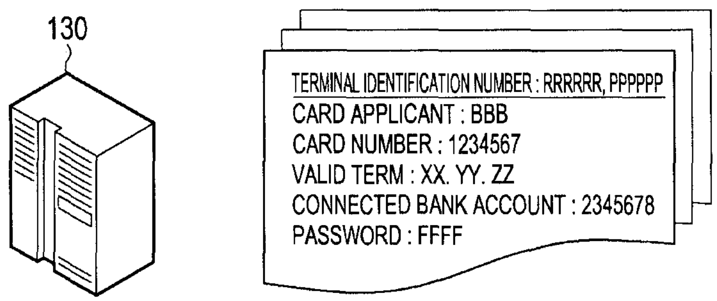

FIGS. 4*a* and 4B illustrate registering a payee terminal in correspondence with the financial account information. As described above, the registration request message includes data identifying the corresponding financial account information, the unique identification number of the payor terminal 110, and the unique identification number of the payee terminal 120. The financial organization server 130 analyzes the received registration request message, and obtains the unique identification number "RRRRRR" of the payor terminal 110 transmitting the registration request message. Further, the financial organization server 130 identifies whether financial account information stored in correspondence with the unique identification number "RRRRRR" of the payor terminal 110 is present. When the financial account information stored in correspondence with the unique identification number "RRRRRR" of the payor terminal 110 is present, the financial organization server 130 registers the unique identification number of the payee terminal 120 included in the received registration request message in association with the corresponding financial account information. Accordingly, when a payment request is made later, and a unique identification number of a corresponding terminal is "PPPPPP", the financial organization server 130 determines whether to approve payment with reference to financial account information mapped with the unique identification number "PPPPPP".

In step 211, the financial organization server 160 generates a message notifying that the payee terminal 120 is registered and transmits the generated message to the payee terminal 120. Further, in step 213, the financial organization server 160 generates the message notifying that the payee terminal 120 is registered and transmits the generated message to the payor terminal 110. Steps 211 and 213 may be omitted.

Figure 5:
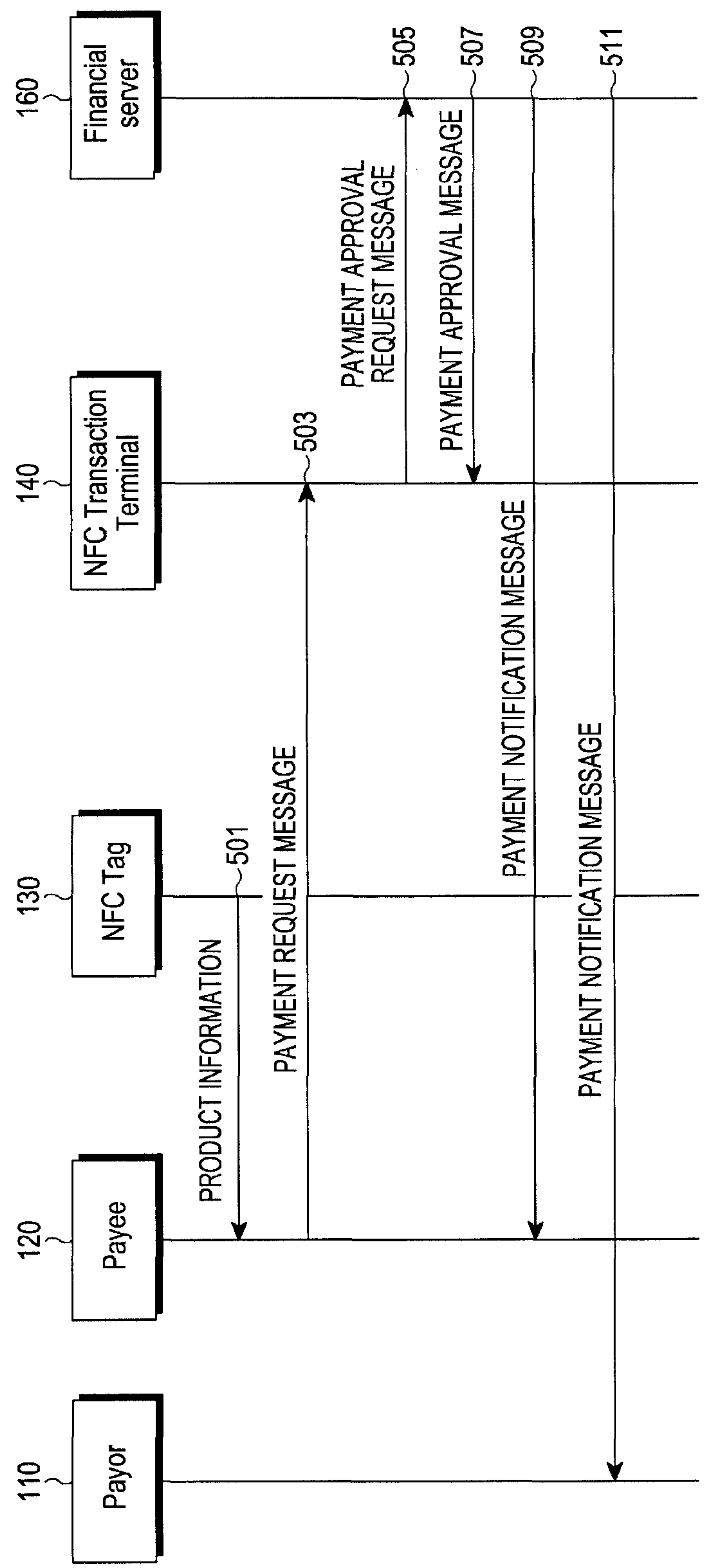
FIGS. 5 and 6 show operations of a process for performing a financial payment by the payee terminal according to an embodiment of the present invention.
Figure 6:
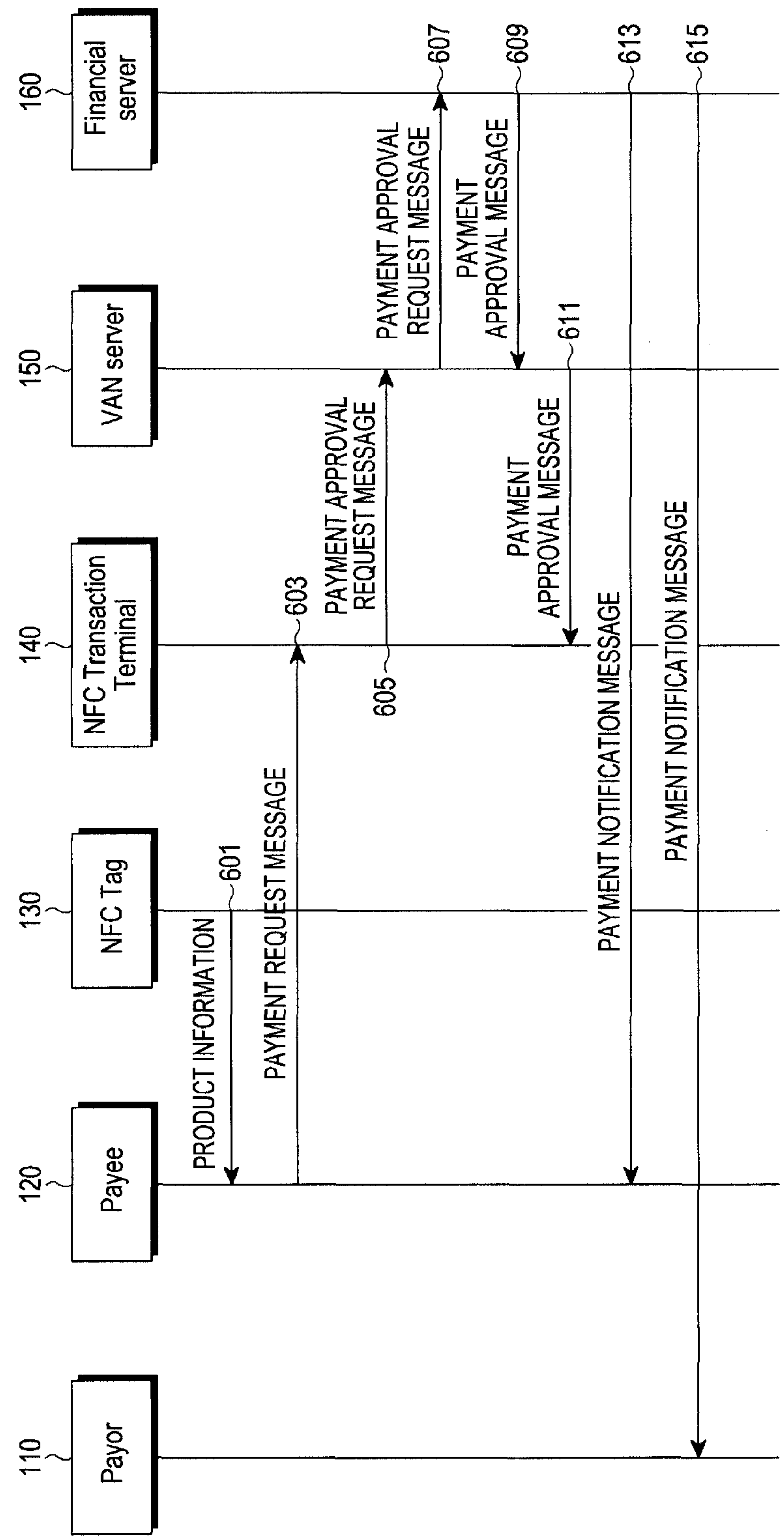

FIGS. 5 and 6 show operations of a process for performing a financial payment by the payee terminal.

In step 501 (FIG. 5), the payee terminal 120 obtains product information. The product information may be obtained from various electronic codes, such as an NFC tag, a barcode, or a QR code attached to the product. Further, the product information includes information identifying at least one of a product name, a product item, and a product price.

In step 503, the payee terminal 120 generates a payment request message including product information concerning a product desired to be purchased, financial account information to be used for the payment, and the unique identification number of the payee terminal 120, and transmits the generated payment request message to an NFC payment terminal 140. The payee terminal 120 displays the product information obtained from at least one product, and displays a guide image enabling the user to select a product to be purchased and a guide image enabling the user to select the financial account information to be used for the payment. In the meantime, the NFC payment terminal 140 make a request for input of the password corresponding to the financial account information to be used for the payment to the user for user authentication.

In step 505, the NFC payment terminal 140 analyzes a payment request message received from the payee terminal 120, generates a payment approval request message based on the analyzed information, and transmits the generated payment approval request message to the financial organization server 130. The payment approval request message includes data identifying a total price of the product desired to be purchased, the financial account information to be used for the payment, and the unique identification number of the payee terminal 120. The payment approval request message may further include the password input from the user, information on an affiliated store in which the NFC payment terminal 140 is located, for example, a store name and an enterprise registration number.

In step 507, the financial organization server 130 analyzes the payment approval request message received from the NFC payment terminal 140, and determines whether to approve the payment. That is, the financial organization server 130 determines whether the financial account information corresponding to the unique identification number of the payee terminal 120 included in the payment approval request message is stored, and when the financial account information corresponding to the unique identification number of the payee terminal 120 included in the payment approval request message is stored, the financial organization server 130 generates a payment approval message, and transmits the generated payment approval message to the NFC payment terminal 140. According to the embodiment, when the password is transmitted together from the NFC payment terminal 140, the financial organization server 130 may identify whether the corresponding password matches the password stored in association with the corresponding financial account.

In step 509, the financial organization server 130 generates a payment notification message notifying of the successful payment and transmits the generated payment notifying message to the payee terminal 120. The payment notifying message includes at least one of the total payment approved price, the affiliated store information, and the product information. Further, in step 511, the financial organization server 160 generates the payment notifying message and communicates the message to the payor terminal 110. Steps 509 and 511 may be omitted.

A VAN server performing payment agent work between the NFC payment terminal and the financial organization server may be further involved. This is illustrated in FIG. 6. The VAN server 150 transmits the payment approval request message and the payment approval message between the NFC payment terminal 140 and the financial organization server 130. The remaining processes are the same as those described with reference to FIG. 5, so detailed descriptions thereof are omitted.

In response to the financial account information being transmitted from the payor terminal 110 to the payee terminal 120, the payor sets a financial transaction of the payee to be restricted within a predetermined range and transmit the financial account information. For example, the payor may determine the payee needs permission from the payor whenever the payee performs the financial payment, and further, may restrict the transaction for at least one of, the amount of money involved in a transaction, a transaction place, a transaction term, a transaction time, and a transaction item.

Figure 7:
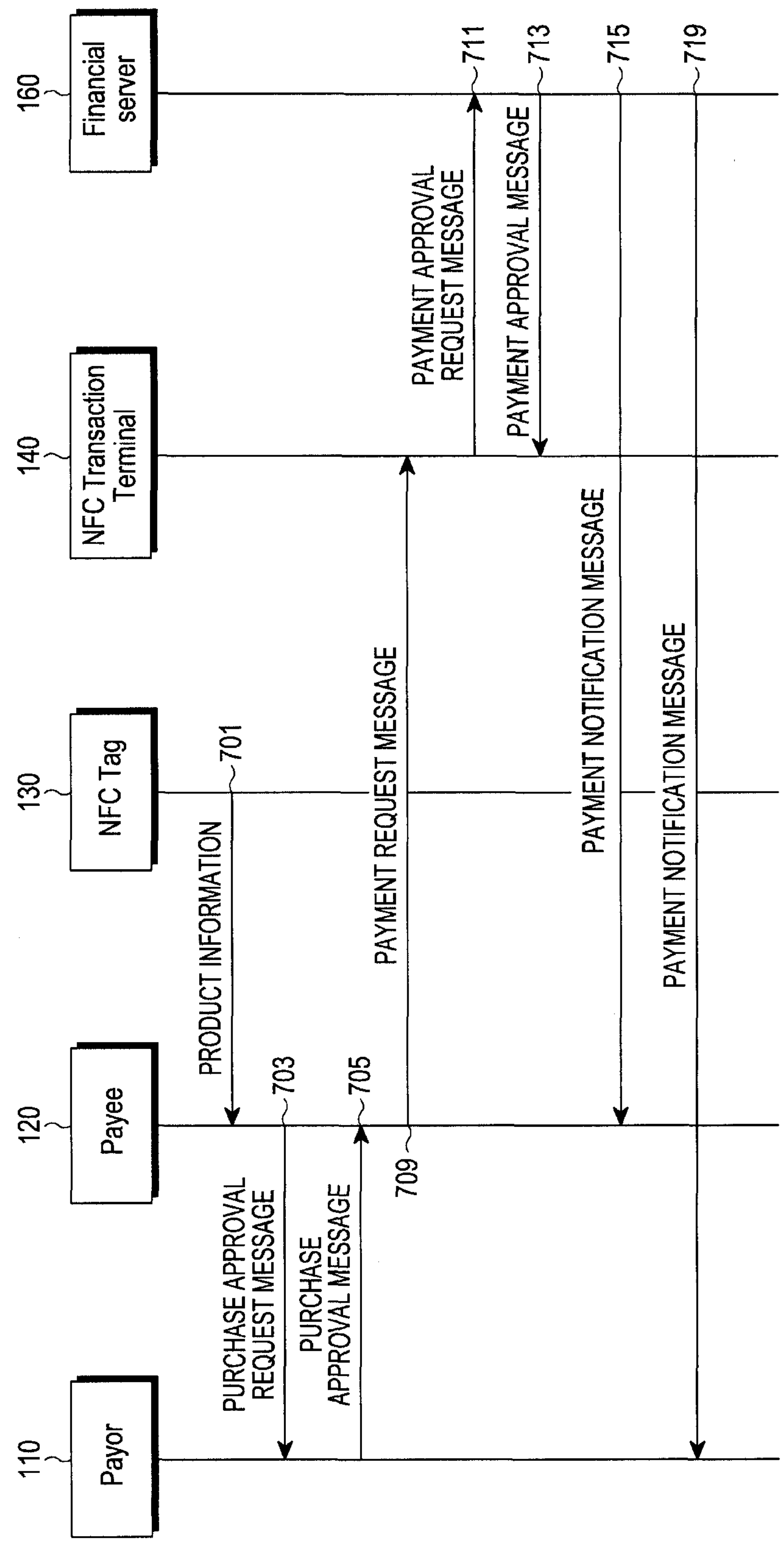
FIGS. 7, 8A and 8B show operations and UI menus used in a process of performing a financial payment by the payee terminal according to another embodiment of the present invention.

FIGS. 7 and 8 show operations and UI menus used in a process of performing a financial payment by the payee terminal FIG. 7 shows a payor granting permission for the financial payment of the payee. It is assumed that the payee gets permission from the payor when the payee performs the financial payment. The need for permission is configurable by a user in an initial production process of the terminal, or by setting a specific field value of the financial account information to a predetermined value when the financial account information is transmitted, or by adding a specific field to the financial account information.

Step 701, and steps 709 to 719 are the same as those described with reference to FIG. 5, so that detailed descriptions thereof are omitted. In step 703, the payee terminal 120 generates a purchase approval request message including product information concerning a product which the payee desires to purchase, and transmits the generated purchase approval request message to the payor terminal 110. In step 705, the payor terminal 110 displays a guide image enabling the payor to approve the purchase according to the purchase approval request message received from the payee terminal 120. The payor may approve the purchase for the entire products which the payee desires to purchase, or may approve the purchase of a part of the products which the payee desires to purchase. The payor terminal 110 generates a purchase approval message permitting the purchase of the products selected by the payor and transmits the generated purchase approval message to the payee terminal 120.

Figure 8A:
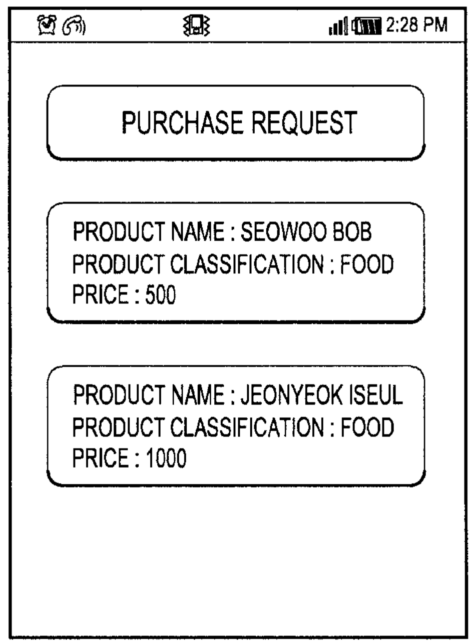
Figure 8B:
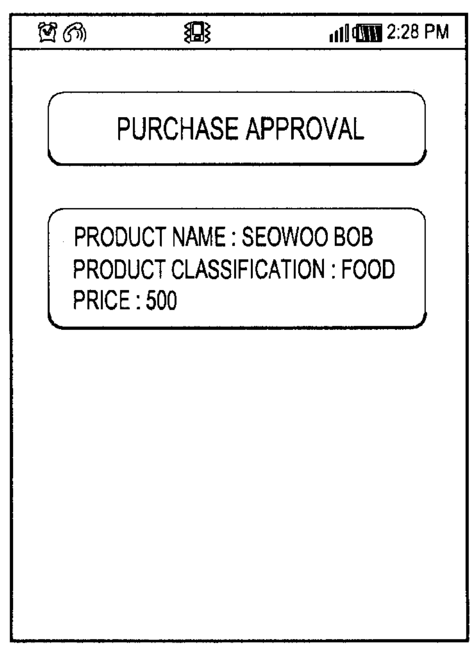

For example, as illustrated in FIG. 8A, it is assumed that product information on two products is included in the purchase approval request message received from the payee terminal 120. In this case, when the payor selects only “Saewoo bob” and not “Jeonyeok iseul”, the payor terminal 110 generates the purchase approval message approving the purchase of the “Saewoo bob” excluding approval of product “Jeonyeok iseul” and transmits the generated purchase approval message to the payee terminal 120 as illustrated in FIG. 8B.

The payee terminal 120 receives the purchase approval message from the payor terminal 110, and displays the information on the purchase admitted product to the payee.

In response to the payee comprising a confirmation, the payee terminal 120 generates the payment request message including the information on the purchase admitted product and transmits the generated payment request message to the NFC payment terminal 140. The embodiment described with reference to FIGS. 7 and 8 may be applied together with the embodiment described with reference to FIGS. 1 to 5.

Figure 9:
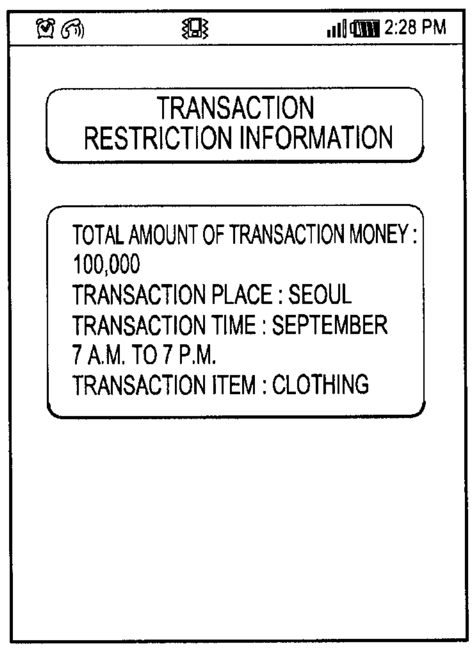
FIG. 9 shows use of transaction restriction information according to an embodiment of the present invention.

As described above, in order to restrict the financial transaction of the payee, as illustrated in FIG. 9, the payor may determine transaction restriction information on at least one of the amount of transaction money, a transaction place, a transaction term, a transaction time, and a transaction item. The determined transaction restriction information is combined with the financial account information to be transmitted to the payee terminal 120. The payee terminal 120 receiving the financial account information combined with the transaction restriction information, determines whether the purchase of the corresponding product is permitted with reference to the transaction restriction information combined with the financial account information when the product for purchase is selected by the payee, and in a case where the purchase is not permitted, the payee terminal 120 displays a guide image notifying the payee of the fact that the purchase is not permitted.

The payor may restrict the amount of transaction money of the payee, for example, a total amount of transaction money or an amount of transaction money for each product item. Here, the total amount of transaction money may be a total mount of transaction money for a predetermined term, for example, one day or one month. In response to selection of the product for purchase by the payee, the payee terminal 120 calculates the total amount of transaction money, and determines whether the calculated total amount of transaction money exceeds a reference amount with reference to the transaction restriction information. When the calculated total amount of transaction money exceeds the reference amount, the payee terminal 120 displays a message notifying that the purchase of the selected product exceeds the reference amount and omits generation of the payment request message.

in response to a restriction of the transaction place being included in the transaction restriction information, the payee terminal 120 determines a location of the payee terminal 120 when the product for purchase is selected by the payee, and identifies whether the payee terminal 120 itself is located in a region in which the transaction is permitted with reference to the transaction restriction information. When it is determined that the payee terminal 120 is not located in the region in which the transaction is permitted, the payee terminal 120 displays a message notifying that the purchase of the selected product is not permitted and omits generation of the payment request message. The determination of the location of the payee terminal 120 itself is performed through sensing information obtained from a GPS sensor and stored map information.

Where a restriction of the transaction term or the transaction time is included in the transaction restriction information, the payee terminal 120 identifies a current time, and identifies whether the current time exceeds the term. When it is determined that the current time exceeds the term, the payee terminal 120 displays a message notifying that the purchase of the selected product is not permitted and omits generation of the payment request message. Further, the payee terminal 120 discards the financial account information of the expired transaction. The financial account information of which the transaction permitted term is expired may be used for comprising a request for renewal of a usage term by the payee. That is, the payee terminal 120 generates a message comprising a request for usage term renewal of the financial account information of which the term is expired when the request of the user is made, and transmits the generated message to the payor terminal 110.

Where a restriction of the transaction item is included in the transaction restriction information, the payee terminal 120 identifies the product information when the product for purchase is selected by the payee, and identifies whether the transaction of the corresponding product is permitted with reference to the transaction restriction information. That is, the payee terminal 120 identifies the product item included in the product information, and identifies whether the item of the corresponding product is a permitted product item. When the product is not a permitted product, the payee terminal 120 displays a message notifying that the purchase of the selected product is not permitted and omits generation of the payment request message.

When the payment notification message is received from the financial organization server 160, the payee terminal 120 transmits the product information to the payor terminal 110. The payee terminal 120 stores the information on a corresponding product when the product for purchase is selected by the payee, and when the payment notification message is received from the financial organization server 160. The payee terminal 120 generates a purchase detail message including the stored product information and transmits the generated purchase detail message to the payor terminal 110.

Figure 10A:
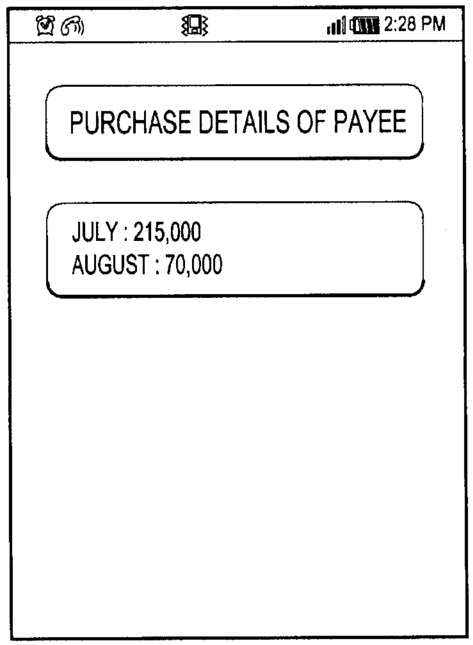
FIGS. 10A, 10B and 10C shows UI menus used in a process of managing purchase details of the payee terminal according to an embodiment of the present invention.
Figure 10B:
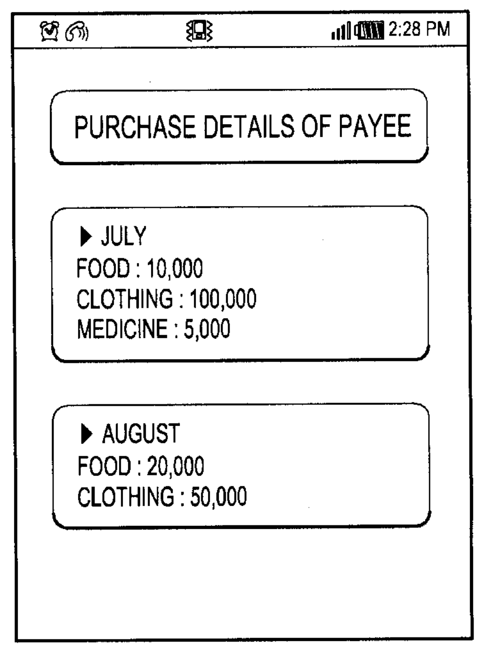
Figure 10C:
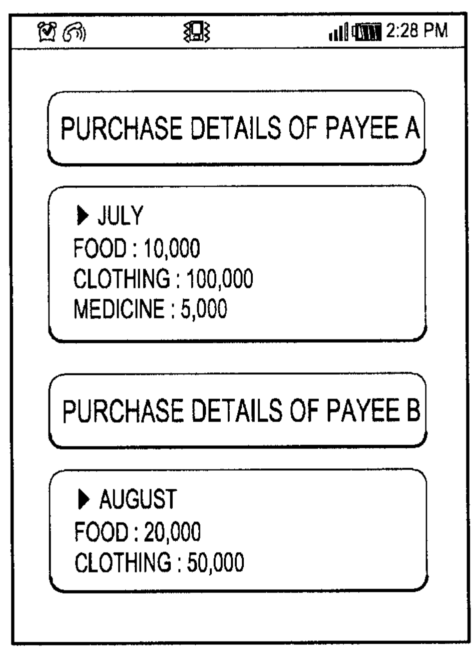

The payor terminal 110 analyzes the purchase detail message received from the payee terminal 120 and stores the information on the product of which the transaction is made. Further, when a request by the payor is made, the payor terminal 110 arranges the purchase details of the payee according to a predetermined method and displays the arranged information. An example of a management image for managing the purchase details of the payee is illustrated in FIG. 10. As illustrated in FIG. 10A, the payor terminal 110 classifies the total amount of purchase money according to the payment performed in the payee terminal and displays the classified total amount of purchase money. Alternatively, as illustrated in FIG. 10B, the payor terminal 110 classifies the amount of money by each product item. When the financial account information is transmitted to multiple payee terminals 120, the payor terminal 110 also displays the amount of purchase money for each payee terminal 120 as illustrated in FIG. 10C.

Figure 11:
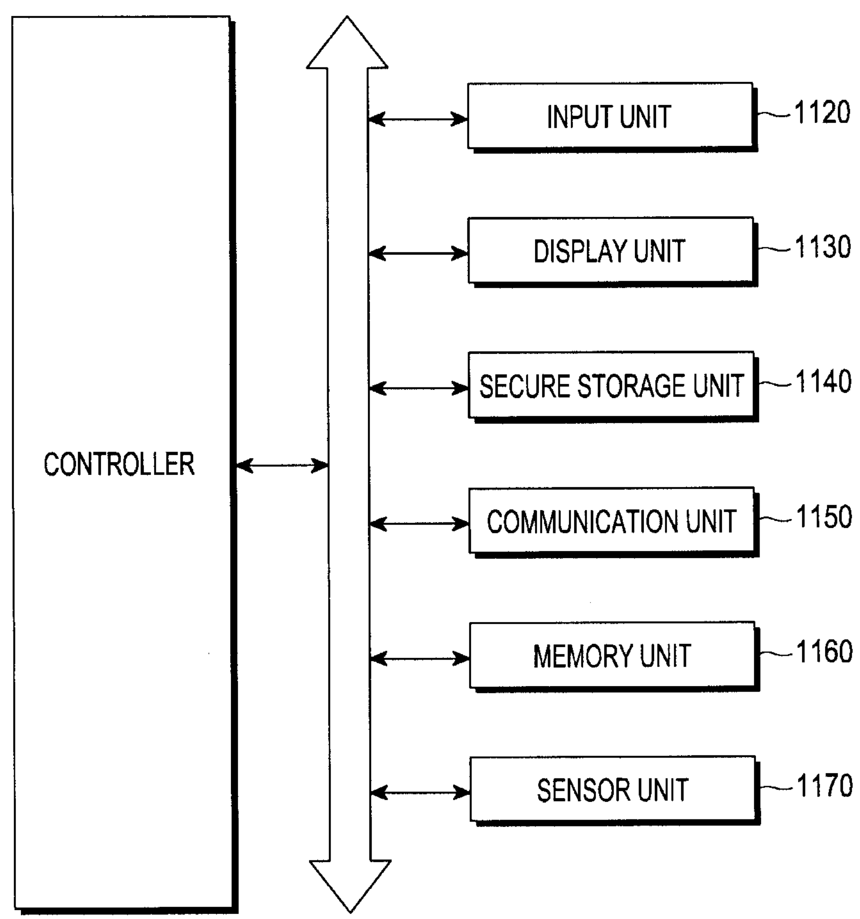
FIG. 11 shows a block diagram of a payment performance apparatus according to embodiments of the present invention.

FIG. 11 is a block diagram illustrating a payment performance system including at least one of a controller 1110, an input unit 1120, a display unit 1130, a secure storage unit 1140, a communication unit 1150, a memory unit 1160, and a sensor unit 1170. The controller 1110 performs transmission and reception of financial account information and various control operations for financial payment. The controller 1110 of the payor terminal 110 executes a financial application when an NFC communication link is established, transmits at least one piece of financial account information selected by the user to the payor terminal 120 through the communication unit 1150, generates a registration request message comprising a request for registration of the payee terminal 120 in correspondence with the transmitted financial account information so that the payee terminal 120 may perform a financial payment by using the transmitted financial account information, and transmits the generated registration request message to a financial organization server, the financial organization server being associated with the transmitted financial account information through the communication unit 150. Further, in response to the controller 1110 transmitting the registration request message, the controller 1110 receives a response message in response to the registration request message from the financial organization server through the communication unit 1150. When a purchase approval request message including product information on at least one product is received from the payee terminal 120 after the transmission of the registration request message, the controller 1110 displays the product information on the display unit 1130, generates a purchase approval message including data identifying at least one product selected by the payor, and transmits the generated purchase approval message to the payee terminal 120 through the communication unit 1150. Further, in response to transmission of the registration request message, the controller 1110 receives a payment notification message including payment detail information of the payee terminal 120 using the transmitted financial account information from the financial organization server through the communication unit 1150. Further, in response to the transmission of the registration request message, the controller 110 receives product information concerning a product of which a payment approval is completed by the financial organization server from the payee terminal 120 through the communication unit 1150 and stores the received product information, and when the payor makes a request for purchase, the controller 1110 displays financial payment details of the payee terminal 120 based on the stored product information by a predetermined method through the display unit 1130. The controller 1110 may displays a guide image for receiving an input of payment restriction information including text data identifying at least one of the amount of money, a term, a location, and an item for which the financial payment is permitted through the display unit 1130, and combines the payment restriction information input by the user with the financial account information and transmits the combined information to the payee terminal 120.

The controller 1110 of the payee terminal 120 receives one or more pieces of financial account information accessible by the payee terminal 120 through the communication unit 1150 in response to the NFC communication link being established, and receives a response message notifying that the payee terminal 120 is registered in association with the received financial account information enabling the payment using the received financial account information from the financial organization server, the financial organization server being associated with the received financial account information through the communication unit 1150. Further, the controller 1110 generates a payment request message including the product information concerning one or more products which the payee selects for purchase and the received financial account information, and transmits the generated payment request message to the NFC payment terminal 140 through the communication unit 1150. Further, the controller 1110 generates a purchase approval request message including the product information concerning one or more products which the payee selects for purchase and transmits the generated purchase approval request message to the payor terminal 110, receives a purchase approval message approving the purchase of at least one product selected from the one or more products from the payor terminal 110 through the communication unit 1150, generates a payment request message including product information concerning the purchase approved product and the received financial account information, and transmits the generated payment request message to the NFC payment terminal 140 through the communication unit 1150. Further, the controller 1110 stores the product information included in the payment request message, and in response to a payment notification message notifying payment approval being received from the financial organization server in response to the payment request message, the controller 1110 transmits the stored product information to the payor terminal 110.

The input unit 1120 and the display unit 1130 may comprise a touch screen. The display unit 1130 displays various guide images for transmission and reception of the financial account information and the financial payment when the financial application is executed. The input unit 1120 transmits the input of the user performed on the various guide images to the controller 1110.

The secure storage unit 1140 includes the financial account information, information necessary for encoding and a Secure Element (SE) for storing the financial application. The secure storage unit 1140 encodes and decodes different types of messages transceived through the communication unit. In a predetermined configuration, the secure storage unit 1140 may be positioned in a general SIM card, or an NFC dedicated SIM card. Otherwise, the secure storage unit 1140 may positioned in a MicroSD card, and may be positioned in a memory embedded in the terminal. Further, the secure storage unit 1140 may store an address of a financial organization corresponding to the financial account information.

The communication unit 1150 includes an NFC communication module capable of performing NFC communication. The NFC communication module may be used for receiving product information, transmission and reception of the financial account with a counterpart terminal, and communication with the NFC payment terminal. Further, the communication unit 1150 may further include a wireless communication module capable of performing 2G communication, such as CDMA-DVDO (CDMA-Code Division Multiple Access, DVDO is a DVDO proprietary company format), 3G communication such as WCDMA-HSDPA (High-Speed Downlink Packet Access) and Wi-Fi, and 4G communication, such as LTE (Long-Term Evolution) and Wibro (WIreless BROadband). The wireless communication module may be used in transmission of the registration request message, reception of the purchase approval request message, transmission of the purchase approval message, and reception of the payment notification message. Further, the communication unit 1150 may further include a code reader unit for reading various electronic codes, such as a bar code or a QR code, attached to the product.

The memory unit 1160 may store an application for managing purchase details, and store product information obtained from a product, and different types of messages received from another terminal and a financial organization server. Further, the memory unit 1160 stores map information, and the stored map information is combined with location information obtained by the sensor unit 1170 to be used for determining whether the terminal is located in a region in which the financial transaction is permitted. The sensor unit 1170 may include a GPS sensor that recognizes a current sensor location and transmits the recognized location to the controller 1110.

Figure 12:
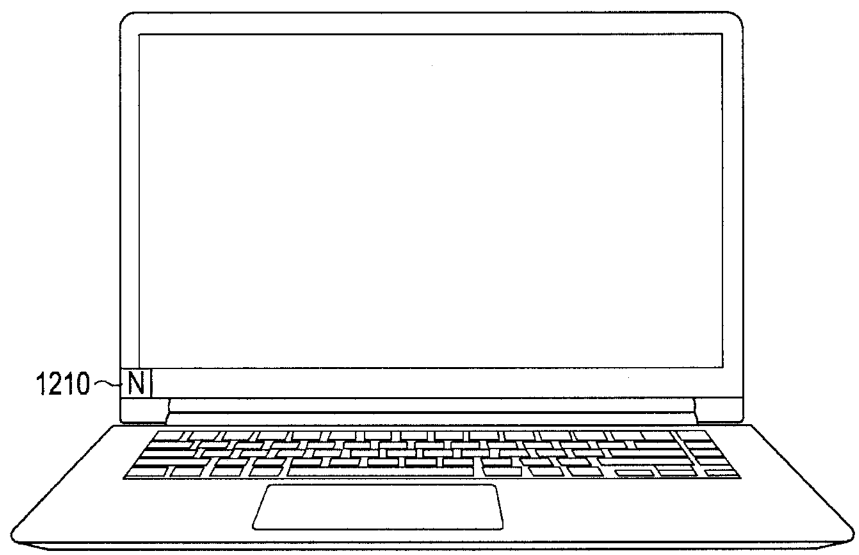
FIG. 12 shows an NFC payment terminal according to an embodiment of the present invention.

The NFC payment terminal 140 is located in an affiliated store but may also be positioned around the user. For example, as illustrated in FIG. 12, the NFC payment terminal 140 is implemented in a form of a chip 1210 in a monitor of the user. In this case, the user may read various electronic code information displayed on a monitor screen during online shopping through a computer and the like, and perform a payment request through the NFC payment terminal 140 attached to the monitor of the user.

The aforementioned embodiments of the present invention may be implemented with random various methods. For example, the embodiments of the present invention may be implemented by using hardware, software, or a combination thereof. When the embodiments of the present invention are implemented with software, the embodiments of the present invention may be implemented with software executed on one or more processors using various operation systems or platforms. Additionally, the software may be written by using a random one among a plurality of appropriate program languages, and may be compiled with an executable machine language code or an intermediate code executed in a framework or a virtual machine.

Further, when the embodiments of the present invention are executed on one or more processors, the embodiments of the present invention may be implemented with a processor recordable medium (for example, a memory, a floppy disk, a hard disk, a compact disk, an optical disk, or a magnetic tape) recording one or more programs for performing a method of implementing the various discussed embodiments of the present invention.

According to the present invention, a plurality of users are enabled to perform a financial payment by using one piece of financial account information without additionally opening a financial account. While the present invention has been shown and described with reference to certain embodiments thereof, it will be understood by those skilled in the art that various changes in form and details may be made therein without departing from the spirit and scope of the present invention as defined by the appended claims. No claim element herein is to be construed under the provisions of 35 U.S.C. 112, sixth paragraph, unless the element is expressly recited using the phrase "means for".

What is claimed is:

1. A method of operation of a first terminal comprising:

obtaining, from a second terminal, identification information of the second terminal based on a Near Field Communication (NFC) connection that is established between the first terminal and the second terminal;

displaying a guide image enabling receiving a selection of financial account information of the first terminal and payment restriction information, wherein the payment restriction information includes at least one of a term, a location, and an item for which a financial payment in the second terminal is permitted;

transmitting, to the second terminal, combined information generated by combining the selected financial account information with the payment restriction information through the NFC connection;

transmitting, to a financial organization server, a registration request message for a request of a registration of the second terminal based on the financial account information in association with the identification information of the second terminal;

receiving a message notifying that the second terminal is registered from the financial organization server, wherein the second terminal is unregistered when the first terminal transmits the financial account information to the second terminal, and the second terminal becomes registered by the first terminal after the first terminal transmits the financial account information to the second terminal, and wherein the second terminal performs the financial payment using the identification information, the selected financial account information and the payment restriction information.

2. The method of claim 1, further comprising:

receiving, from the second terminal, a purchase approval request message including product information concerning one or more products;

generating a purchase approval message approving a purchase of one or more products;

transmitting the purchase approval message to the second terminal; and receiving, from the financial organization server, a payment notification message notifying that a payment for the purchase of the one or more products is approved.

3. The method of claim 2, wherein the payment notification message includes detail information related to the payment requested by the second terminal using the financial account information.

4. The method of claim 1, further comprising:

receiving, from the second terminal, product information concerning a product for which approval of a payment for a purchase of one or more products is completed by the financial organization server;

storing the product information in a memory; and displaying financial payment details of the second terminal based on the stored product information.

5. The method of claim 1, wherein the registration request message comprises identification information of the first terminal, the identification number of the second terminal, or the financial account information.

6. The method of claim 1, wherein the financial account information comprises credit card information or bank account information, the credit card information including a credit card issuing company, a credit card applicant, a credit card number, a valid term, a password or a connected bank account, and the bank account information including an account opening bank, a bank account applicant, a bank account number or a password.

7. The method of claim 1, wherein transmitting financial account information from the first terminal to the second terminal by using the Near Field Communication (NFC) connection, further comprises transmitting the financial account information from the first terminal directly to the second terminal using the NFC connection.

8. The method of claim 1, further comprising:

displaying, when executing a financial application, financial account information relating to a plurality of financial accounts stored in the first terminal; and selecting financial account information relating to one financial account from among the displayed financial account information relating to the plurality of financial accounts.

9. The method of claim 8, wherein transmitting financial account information comprises transmitting the selected financial account information to second terminal through a NFC interface.

10. The method of claim 8, wherein transmitting a message for a request of a registration of the second terminal comprise transmitting a message for a request of a registration of the second terminal based on the selected financial account information in association with the identification information of the second terminal.

* * * * *